J. F. A. AERTS.
Car-Axle Box.

No. 46,196. Patented Jan. 31, 1865.

Witnesses: Inventor:

UNITED STATES PATENT OFFICE.

JEAN FRANÇOIS AUGUST AERTS, OF ANTWERP, AND PAUL FRANÇOIS AERTS, OF BRUSSELS, ASSIGNORS TO JEAN FRANÇOIS AUGUST AERTS, OF ANTWERP, BELGIUM.

IMPROVED LUBRICATOR.

Specification forming part of Letters Patent No. 46,196, dated January 31, 1865.

*To all whom it may concern:*

Be it known that we, JEAN FRANÇOIS AUGUST AERTS, of Antwerp, and PAUL FRANÇOIS AERTS, of Brussels, in the Kingdom of Belgium, have invented certain new and useful apparatus for continual lubrication by means of water, oil and water, soap and water, or other suitable liquids, applicable to all kinds of rolling-stock and also to shafts in general; and we do hereby declare that the following, taken in connection with the drawings, is a full, clear, and exact description thereof.

Figure 1:
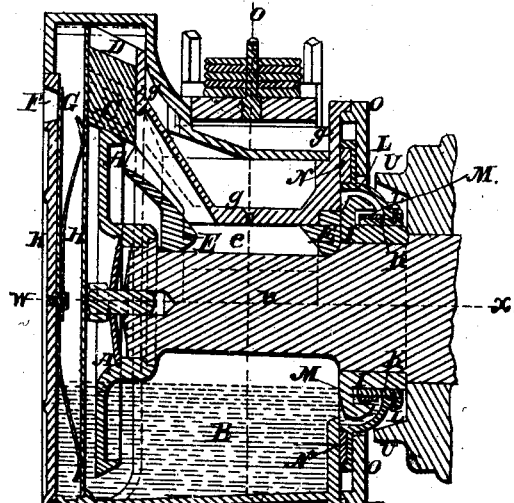
Figure 2:
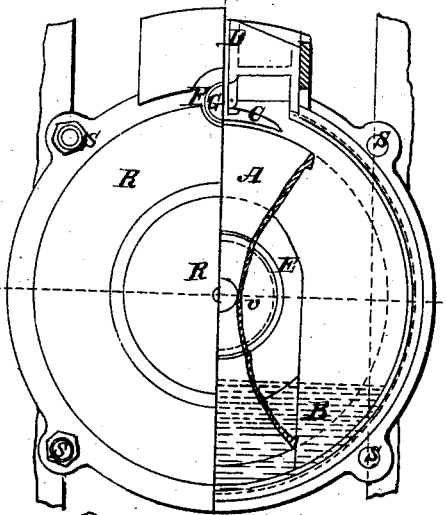
Figure 3:
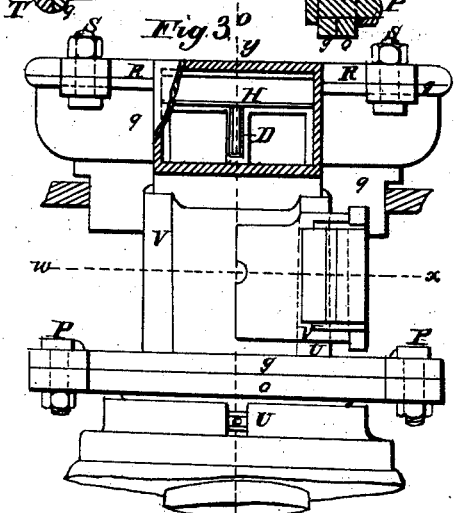
Figure 4:
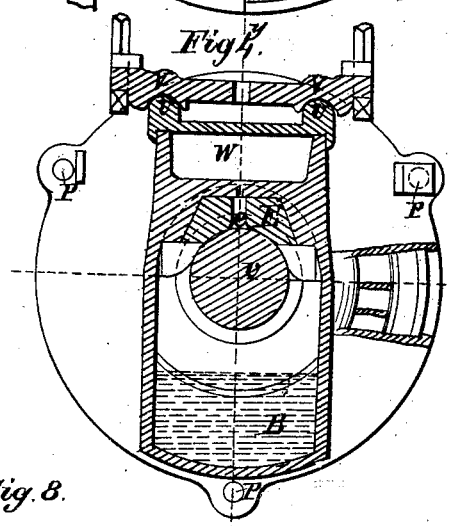
Figures 5, 8:
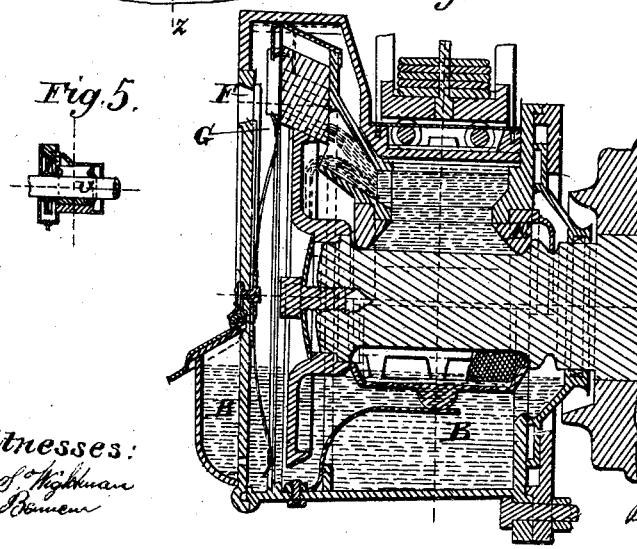
Figures 6, 7:
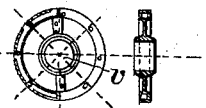

In the drawings, Figure 1 is a longitudinal section through an apparatus made according to the principles of our invention in the form we prefer for railroad-car axles, the section being taken on the line $yz$ of Fig. 2. Fig. 2 is a front elevation of the contrivance, with part of the front plate and part of the rotary disk or pump represented as broken away. Fig. 3 is a plan or top view of the apparatus with parts represented as broken away, so as more fully to represent the construction. Fig. 4 is a vertical cross-section on the line $w\,x$ of Fig. 3. Fig. 5 is a vertical longitudinal section through the apparatus in a modified form where a lower brass is used, and Figs. 6 and 7 are modifications of the revolving disk suitable for use at low velocities of the shaft, and Fig. 8 is a vertical central section through a modification of the apparatus applied to a railroad-car axle.

The shaft $v$ enters a box, $q\,q$, cast in one piece, and constituting at its lower part a reservoir, B, suitable for holding water, and upon the end of the shaft we secure the disk A, preferring to fasten it by a spring and a screw-bolt, as shown in the drawings, so as to permit end play, if necessary. A guide, $c\,c$, shaped substantially as shown in the drawings, so as to scrape water or other liquid that may be used off the surface of the disk, is mounted in the slot D D and rests upon the disk either by its own weight or by the pressure of a slight spring. The bronze bearing is represented at E E, and is provided with a slit or channel-way, substantially as represented in the drawings, so formed as to receive water lifted by the disk or rotary pump and conduct that water between the bearing and the axle or shaft.

F F represents an opening, through which water may be introduced into the box, and it may be closed by a disk, G, mounted upon a spring. H is a partition, made of sheet-metal, fitting closely to the inside of the box and resting upon a little flange, against which it is pressed by a spring. This partition has small holes drilled through it near its bottom, so as to permit water or other liquid to pass through the partition. This partition divides the box into two compartments, and is an additional safeguard, preventing dust and foreign substances from being deposited upon the bearings.

A flanged collar, I, is keyed upon the axles in such manner that it may be easily removed, if necessary. This flange is beveled on the side nearest the box and tends to return to the reservoir any water that may escape endwise between the brass and the shaft. As a substitute for this collar a flange may be formed upon the axle or shaft itself, as shown in Fig. 8, or one or more grooves may be turned in the shaft, the object of the contrivance being to prevent water from escaping endwise along the axle and to return to the reservoir water that may pass endwise between the brass-bearing and the axle. In order to make a water and dust proof joint between the shaft and the box we apply a turn-plate or collar, L, so shaped, substantially as represented, as to apply itself both to the box and the collar I, or the axle, if a collar is not used. This turn-plate is packed to the box by suitable packing—such as a leather or india-rubber ring, N, and to the collar I by a ring of leather or india-rubber, K. The ring N lies in a recess and both it and the collar are pressed against the box by a plate, O, held in place by bolts P P, and the ring K is secured by small screws, (see Fig. 1,) and is kept in tight contact with the shaft or axle by a hoop, $m$, of steel, or it may be so formed, as in Fig. 8, that the steel spring is unnecessary. The front of the box is closed up by a plate, R, held in place by bolts S S, and the joint is made water-tight by a packing-ring, T. In order to prevent dust, &c., from depositing upon the leather collar or flanges, we attach to the axle or wheel or make in one piece therewith a protector, V, shaped substantially as represented.

By examination of the drawings it will be perceived that there is provision for slight relative end play of the axle with reference to the box and its appurtenances and the brass.

We prefer to cover the shaft and the brass with a thin coat of pure tallow or other grease before the parts are put together. The reservoir is then to be filled with water, or water mixed with oil or grease or soap, or other lubricating substances, and when the shaft is put in motion in either direction the lubricating liquid will be lifted up by the disk scraped off by the guide or scraper C, and thrown down through the channel e upon the top of the shaft, whence it will pass between the brass and the shaft and return to the reservoir. Actual trial has proved that railroad-car journals, fan-journals, &c., may be run for months by the use of this apparatus, but in case any accident should cause the box to leak to a great extent, or there should be an omission in supplying it with water or lubricating mixture, there is located above the box proper a chamber, W, which is, by means of a small opening, (see Figs. 1 and 4,) in communication with the channel in the brass or bearing. This opening should be stopped with solid fat or grease, and the box filled with the same or semi-fluid grease. In the event of a loss of fluid in the main box to such an extent as to cause heating of the brass and shaft, the stopper in the opening will melt, and the grease contained in the chamber will descend gradually through the opening into the channel and thus lubricate the shaft. This supplementary box may be used as a reservoir of water or other lubricating fluid.

In Fig. 8 the leather collar around the axle is shown as of such shape that the spring may be dispensed with, and the reserve or supplementary box is also removed from the apparatus. An extra water-box is also represented outside of the main axle-box and connected with it by small holes. Dust is prevented by the water from entering these holes, and will settle below them. Any dust that may in spite of all precautions enter the space between the partition and the front of the box will settle to the bottom of that space, below the apertures in the partition, and as the water there is undisturbed such dust will not be carried onto the axle.

When shafts are run at such low velocities—say from ten to seventy revolutions per minute—that a disk without buckets will not carry up water by the adhesion thereof to its surface, we intend to substitute for it a wheel or disk with buckets, as represented in Figs. 6 and 7. These buckets have two openings—one in the periphery, the other in the face of the wheels—and, although they commence discharging as soon as they leave the water, will nevertheless carry up above the shaft a sufficient quantity to lubricate it. The discharge-holes on the face may be closed from the time they leave the water until they reach the point where they deliver it to the brass by a stationary plate bearing against the face of the wheel and extending from the water to the point of delivery of water above the shaft. In cases where dust is not to be guarded against, the fittings on both ends of the box, to exclude it, may be dispensed with, and a simple gutter-shaped collar, as indicated in Fig. 5, may be applied to the front of the box so as to prevent escape of water carried up by the disk. Where the weight of the shaft is to be carried by a brass, the reservoir may be entirely outside of the lower brass, as indicated in the same figure.

We claim as our invention—

1. In combination, a shaft or axle, a reservoir of water or lubricating liquids, or mixtures thereof, a brass or bearing, so grooved or channeled, substantially as described, as to receive and carry water or fluid lubricating material to the rubbing-surfaces, and a disk or wheel attached to and revolving with the shaft, so as to carry fluid lubricating material and supply it to a brass, the combination operating substantially as set forth.

2. In combination with an axle or shaft and a reservoir of water, a channeled brass and a rotating disk, and a close box, preventing the entrance of dust and the escape of water, and in which the joint between the box and the axle is closed by packing-rings, applied substantially as described.

3. In combination with a packing-ring, making a joint with an axle, a concave or dishing protector attached to or making a part of a wheel or an axle, and acting substantially as described.

4. In combination with a box and a reservoir of water, a guard plate or disk, making a partition between the front inclosure of the box and a water-lifting apparatus, substantially as described.

JEAN FRANÇOIS AUGUST AERTS.
PAUL FRANÇOIS AERTS.

In presence of—
FRANÇOIS HAERTT,
E. AERTS.